Aug. 4, 1970         HIDEO TATIBANA        3,523,017
APPARATUS FOR AUTOMATICALLY FUSION SEALING GLASS AMPULES
Filed March 20, 1968         2 Sheets-Sheet 1
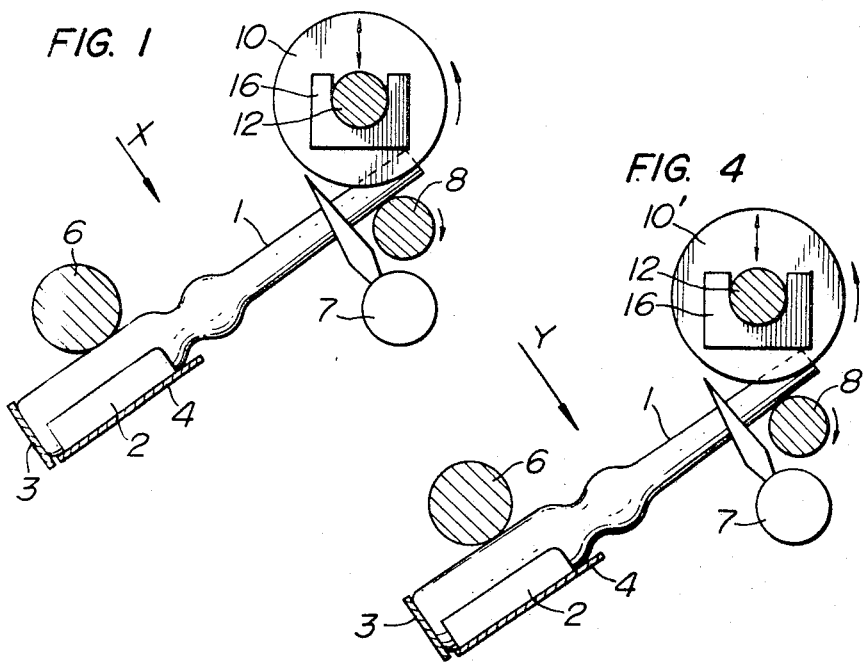
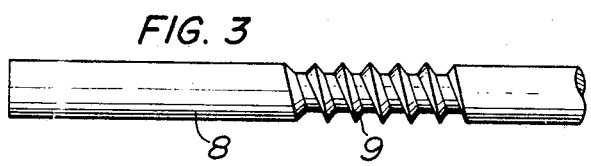
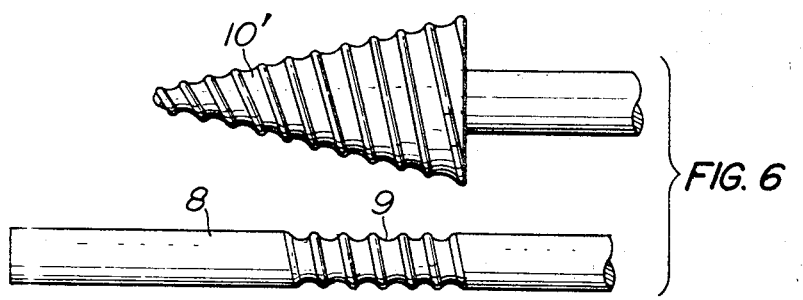
INVENTOR
Hideo Tatibana
BY Karl W. Flocks
ATTORNEY

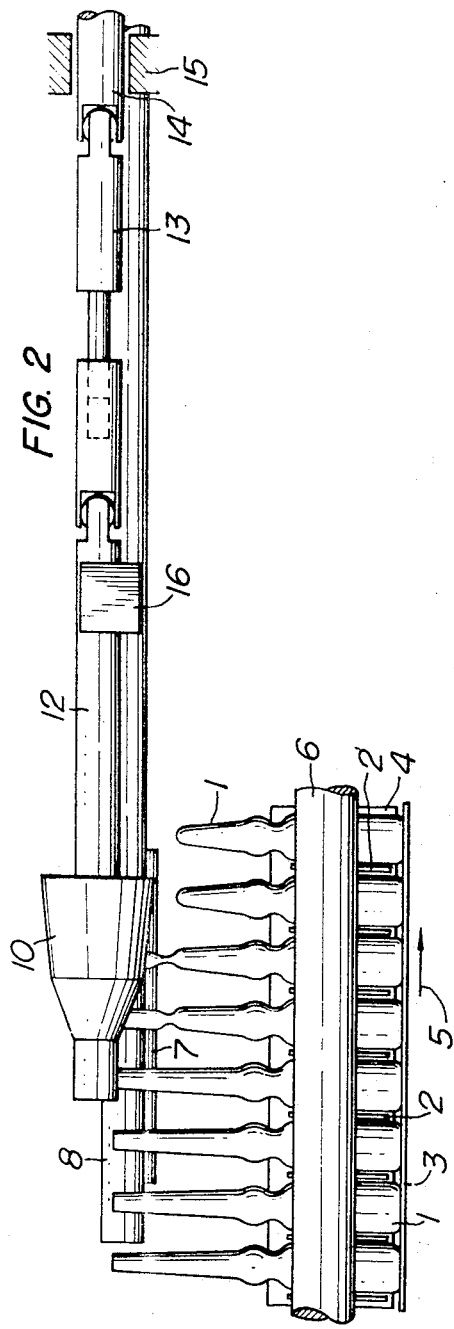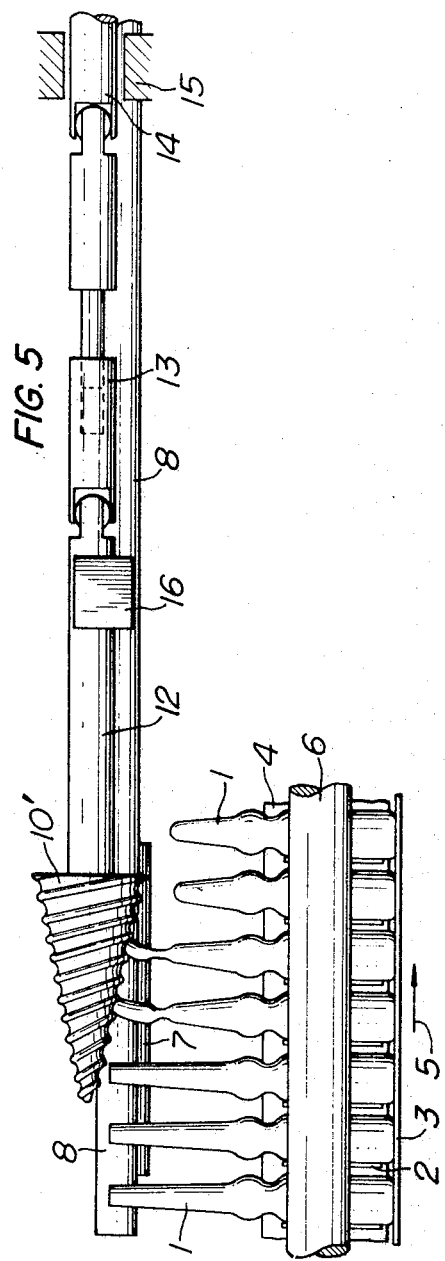

United States Patent Office 3,523,017
Patented Aug. 4, 1970

3,523,017
APPARATUS FOR AUTOMATICALLY FUSION SEALING GLASS AMPULES
Hideo Tatibana, 3–5 Nakano-6-chome,
Nakano-ku, Tokyo, Japan
Filed Mar. 20, 1968, Ser. No. 714,674
Claims priority, application Japan, Apr. 25, 1967, 42/26,029
Int. Cl. C03b 23/00
U.S. Cl. 65—270
2 Claims

ABSTRACT OF THE DISCLOSURE

A succession of glass ampules positioned on an inclined running conveyor means are heated when they are carried past a gas burner means. The free end portions of the ampules are frictionally engaged by a rotatable cone member and a rotatable propelling rod from the time before or immediately after the neck portions of said ampules are fused or softened by heating. The neck portions as fused or softened are stretched out simultaneously with the fusion or softening thereof until the free end portions thereof are separated from the body portions thereof, and then the separated portions of the ampules are fusion sealed. The cone member is provided with means positioned above the ampules without contacting the ampules for supporting the cone member movably upward and downward to continuously press down the ampules under the weight of the cone member.

---

The present invention relates to an apparatus for automatically fusion sealing glass ampules, and more particularly to improvements of the apparatus as disclosed in my U.S. patent specification No. 3,124,445.

The previous specification discloses an apparatus for automatically fusion sealing the open-end neck portions of glass ampules comprising a conveyor means adapted to proceed at a uniform speed and having an inclined conveyor surface adapted to carry a succession of the ampules within the open end portions thereof directed rearwardly and upwardly, a presser belt arranged to frictionally engage the body portions of said ampules being carried by said conveyor means in succession so as to rotate said ampules about their own axes, a gas burner means arranged to heat said neck portions of said ampules in succession at a predetermined point adjacent to the open end portions thereof as said ampules are carried while rotating about their own axes, a rotatable propelling rod having a helical groove formed thereon to supportingly receive and advance said open end portions of said ampules in succession along with the body portions thereof after said open end portions have sagged under their own weight as the neck portions of the ampules are heat-softened by said gas burner means, and a rotatable cone member arranged to press said open end portions of the ampules being advanced by said rotatable propelling rod against the latter and to rotate so as to pull said open end portions away from the respective body portions of the ampules as required.

In the apparatus disclosed in the previous specification, after the open end portion of an ampule sags due to the heat-softening of the neck portion of the ampule by the gas burner means while the ampule is carried away by a conveyor means, the sagged portion is nipped between the helical groove of the rotatable propelling rod and the cone surface of the rotatable cone member and then is pulled away from the associated body portion of the ampule when the ampule passes through between said rod and cone member, and lastly the ampule is fusion sealed at the heated neck portion thereof. However, in such a construction of the above U.S. patent, a wasteful heating must be applied to the neck portions of the ampules until the open end portions thereof can sag.

The present invention has for its object to remedy the above drawback. In the present apparatus, said rotatable cone member is disposed on the other side of said rotatable propelling rod with respect to said ampules, and is freely supported so as to be able to move on toward or go away from said propelling rod so that the free end portions of the ampules can be frictionally engaged by said rotatable cone member and rotatable propelling rod before or immediately after the neck portions of said ampules are fused or softened by heating. The neck portions as fused or softened may be stretched out simultaneously with the fusion or softening thereof.

In accordance with the pesent invention, there is provided an apparatus for automatically fusion sealing the open-end neck portions of glass ampules comprising a conveyor means adapted to proceed at a uniform speed and having an inclined conveyor surface adapted to carry transversely a succession of the ampules with the open end portions thereof directed rearwardly and upwardly, a presser belt arranged to frictionally engage with the body portions of said ampules being carried by said conveyor means in succession so as to rotate said ampules about their own axes, a gas burner means arranged to heat said neck portions of said ampules in succession at a predetermined point adjacent to the open end portions thereof as said ampules are carried while rotating about their own axes, a rotatable propelling rod having a helical feed formed on a part thereof to supportingly contact with said ampules at the portions adjacent to their open ends, and a rotatable cone member supported movably upward and downward and located on the opposite side of said helical feed of said propelling rod with respect to the neck portions of said ampules with the axis of said cone member parallel to said conveyor means thereby to continuously press down said ampules due to its own weight.

According to another feature of this invention, said rotatable cone member is provided with spiral threads on a cone surface thereof so that the neck portions of the ampules may closely engage with said cone member and fusion sealing operation may be carried out more accurately and quickly.

The present invention will be made more apparent from the following description taken in reference to the accompanying drawings which show some preferred embodiment thereof and in which:

FIG. 1 is a schematic side elevation of the apparatus embodying the invention,

FIG. 2 is an oblique view of the apparatus of FIG. 1 as seen from the direction shown by an arrow X, FIG. 3 is a front elevational view of the rotatable propelling rod having a helical groove thereon, FIG. 4 is a schematic side elevation of another embodiment of this invention, FIG. 5 is an oblique view of the apparatus of FIG. 4 as seen from the direction shown by an arrow Y, FIG. 6 is a front elevational view of the rotatable cone member and the rotatable propelling rod, respectively, as shown in FIGS. 4 and 5.

Referring to FIGS. 1, 2 and 3, a succession of glass ampules 1 are carried at regular intervals in the direction indicated by an arrow 5 with the open end portions directed upwardly and rearwardly by a conveyor means 4. An abutment plate 3 extends along the lower edge of said conveyor means 4 to support the bottoms of said ampules 1. Reference numeral 2 indicates partitions regularly spaced on the inclined conveyor surface so as to accommodate therebetween the body portions of the ampules 1. A presser belt 6 is provided extending parallel to the conveyor surface to frictionally engage the body portions of the ampules being carried by the conveyor so that the ampules each rotate about their own axes while being carried forward. A gas burner means 7 is arranged extending over a predetermined length parallel to the conveyor means 4 for the purpose of heating the neck portions thereof. A rotatable propelling rod 8 is arranged extending parallel to the conveyor means from the position adjacent to the position where said heating is to be commenced by said gas burner means 7 to the downstream direction so that a helical feed 9 formed on a part of said propelling rod 8 can supportingly contact with the ampules 1 at the portions adjacent to their open ends thereof. A rotatable cone member 10 is disposed on the opposite side of said propelling rod 8 with respect to the neck portions of the ampules with the axis of said cone member 10 parallel to said conveyor means 4. The cone member 10 has a shaft 12 fitted thereon which is connected to a rotary shaft 14 by a universal joint 13. The rotary shaft 14 is journaled in a conventional bearing 15, and the shaft 12 is supported upward by a bearing 16 positioned above the ampules without contacting the ampules and which is open at the upper portion thereof as shown in FIG. 1.

Each of the grooves between spiral threads of the helical feed 9 has a dimension just to accommodate the neck portion of the ampule 1 being advanced in succession while the body portion of the ampule is accommodated in the spacings between the partitions 2. The rotational speed of said propelling rod 8 should be selected in such a way that the ampules may be advanced in succession with the neck portions thereof as positioned in place held against accidental displacement relative to the respective grooves of said helical feed 9 when being carried by the conveyor means 4 as aforementioned.

In operation, a succession of glass ampules 1 are firstly positioned on the inclined conveyor surface so that the body portions thereof may be accommodated in the spacings between the partitions 2 with the bottoms abutting against the abutment plate 3, each of the spacings between adjacent partitions substantially corresponding to the outer diameter of the ampules. The ampules are advanced forward together with the conveyor means when the latter operates while rotating about their own axes due to frictional engagement of the ampule bodies with the presser belt 6. As the ampules are carried past the gas burner means 7, a predetermined region of the neck portion of the ampule comes into contact with the flame of the gas burner means 7 and is heated thereby to be fused or softened. On the other hand, when the portions adjacent to the free end portions of the ampules being advanced in succession come in to engage with the grooves of said helical feed 9 and said cone member 10, the engaged portions of the ampules tend to be continuously pulled up by the friction with the cone member 10. As the cone member 10 can freely move upward and downward in accordance with the aforementioned construction of the cone member 10, it is adapted to continuously press down the ampules due to its own weight. Therefore, the free end portions of the ampules can be arranged to be engaged by the rotatable cone member 10 before they are fused or softened by the burner means 7 different from the case of the aforesaid U.S. Pat. No. 3,124,445.

In other words, in accordance with the present invention, the free end portion of the ampule may be continuously pulled away from the associated body portion thereof before the neck portion of the ampule is fused or softened, and the neck portion as fused or softened may be stretched out simultaneously with the fusion or softening thereof until the free end portion thereof is separated from the body portion thereof, and lastly the separated neck portion of the ampule may be fusion sealed. As the result, it will be understood that the present invention can avoid wasteful heating and can promote operation efficiencies.

The embodiment of FIGS. 4, 5 and 6 is generally similar to that of FIGS. 1, 2 and 3 except the former uses a rotatable cone member 10' provided with spiral threads on a cone surface thereof so that the neck portions of the ampules may engage with grooves between said threads. In accordance with the second embodiment, as the free end portion of the ampule may closely fit into both grooves of the helical feed 9 and the rotatable cone member 10', a pulling force acted on the free end portion to be separated from the associated body portion thereof may be promoted due to increase of the friction engaging surfaces, so that fusion sealing operation may be carried out more accurately and quickly.

While the present invention has been described in connection with particular embodiments, it is to be understood that it is easily capable of obtaining various modifications and improvements. Changes, therefore, in the construction and arrangement may be made without departing from the spirit and scope of the invention as disclosed in the appended claims.

What is claimed is:

1. An apparatus for automatically fusion sealing the open-end neck portions of glass ampules comprising a conveyor means to proceed at a uniform speed and having an inclined conveyor surface to carry transversely a succession of the ampules with the open end portions thereof directed rearwardly and upwardly, a presser belt to frictionally engage with the body portions of said ampules being carried by said conveyor means in succession so as to rotate said ampules about their own axes, a gas burner means to heat said neck portions of said ampules in succession at a predetermined point adjacent to the open end portions thereof as said ampules are carried while rotating about their own axes, a rotatable propelling rod having a helical feed formed on a part thereof to supportingly contact with said ampules at the portions adjacent to their open ends, a rotatable cone member located on the opposite side of said helical feed of said propelling rod with respect to the neck portions of said ampules with the axis of said cone member parallel to said conveyor means thereby to continuously press down said ampules due to its own weight, and means positioned above said ampules without contacting said ampules for supporting the rotatable cone member movably upward and downward to continuously press down said ampules by the cone member onto the rotatable propelling rod due to the own weight of the cone member.

2. The apparatus according to claim 1, in which said rotatable cone member is provided with spiral threads on a cone surface thereof.

References Cited

UNITED STATES PATENTS

| | | | |
|---|---|---|---|
| 3,124,445 | 3/1964 | Tatibana | 65—283 |
| 3,360,352 | 12/1967 | Sundstrom | 65—297 |
| 3,384,468 | 5/1968 | Dean | 65—58 |

S. LEON BASHORE, Primary Examiner

E. R. FREEDMAN, Assistant Examiner

U.S. Cl. X.R.

65—105, 109, 276, 278, 292